Nov. 18, 1969  M. C. CLERC  3,479,511
NUCLEAR RADIATION GAUGE SYSTEM
Filed June 1, 1965
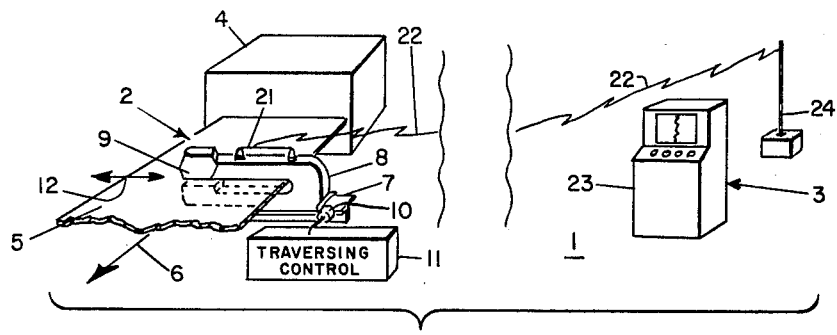
*Fig. 1*
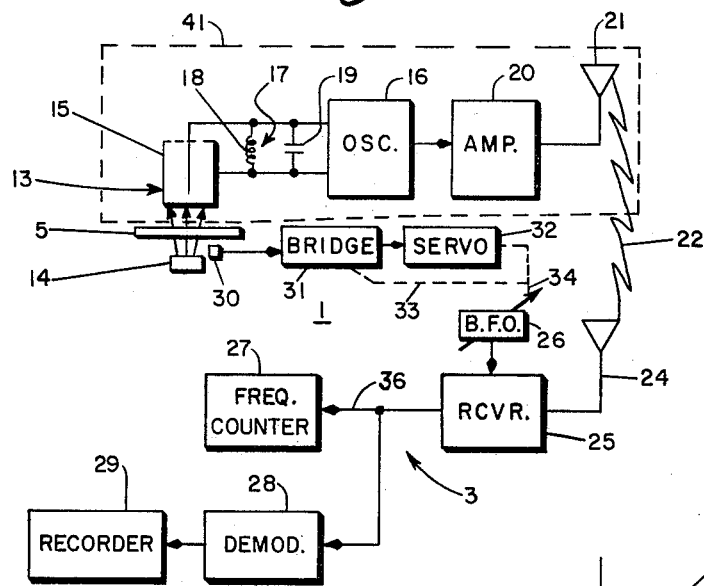
*Fig. 2*
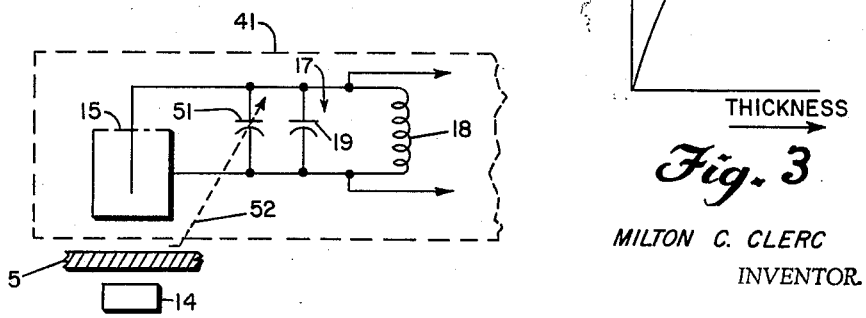
*Fig. 4*
*Fig. 3*
MILTON C. CLERC
INVENTOR.
BY William T. Fryer III
ATTORNEY

United States Patent Office 3,479,511
Patented Nov. 18, 1969

3,479,511
NUCLEAR RADIATION GAUGE SYSTEM
Milton C. Clerc, Worthington, Ohio, assignor to Industrial Nucleonics Corporation, a corporation of Ohio
Filed June 1, 1965, Ser. No. 460,178
Int. Cl. G01t 1/18
U.S. Cl. 250—83.6                    11 Claims

ABSTRACT OF THE DISCLOSURE

In one embodiment the present invention is a measuring system with a scanning gauge to be mounted for movement across a traveling sheet of material formed or treated in some way by an industrial process. The scanning comprises a sensor having a condition which varies with a property of the sheet material. The gauge includes means for generating a radio-frequency signal and electromagnetically radiating the signal to a location remote from the gauge position. The sensing means condition causes the frequency of the signal to vary, converting the property variation into a proportional change in the radiated signal. At a remote location, means is provided for receiving the electromagnetically radiated signal, measuring the frequency change, and converting the frequency change into a corresponding indication of the property.

In another embodiment of the present invention there is apparatus and method for compensating a nuclear radiation gauge for changes in air-gap condition. A nuclear radiation gauge produces a pulse train having a frequency determined by the radiation received from the material. The material property to be measured affects the radiation intensity. The method includes the steps of comparing the frequency of the gauge pulse train with a reference pulse train of a predetermined frequency to measure the property, and varying the reference pulse train frequency to compensate the measurement for changes due to air-gap condition.

---

The invention to be described herein is related to the art of control and utilization of raw materials. Many industrial processes are geared to the production of high quantities of materials. In these processes a deviation of a material property in excess of a desired value from a target property can represent the loss of many dollars in raw materials. Systems have been designed to accurately measure the material property and control the process more closely to the desired target. The present invention is an improved system for measuring the property of a sheet material produced by an industrial process using a gauge that scans across the sheet material.

PRIOR ART SYSTEMS

Prior measuring systems using a scanning gauge have been suitable for processes with apparatus stages spaced apart or relatively accessible areas for installation of a gauge and related signal processing equipment. Examples of such systems are shown in United States Patents 3,007,052 and 3,108,844. However, many industrial processes have apparatus stages that are a vast complex of tightly knit machinery arranged hundreds of feet from any area where signal processing equipment associated with the scanning gauge can be located. Frequently, there is room to install the scanning gauge, but there remains the problem of conveying the scanning gauge signal to the signal processing equipment at a remote location.

Most of the prior art scanning gauges have utilized a sensor mounted in the gauge, for measuring the material property. The sensor has been connected through cables to the signal processing equipment. The cables introduced impedance matching problems and diminished the available signal.

In gauges using nuclear sensors, such as the transmission of nuclear radiation through the sheet material to an ionization chamber, a change in a small micro-micro ampere current had to be sensed. The ionization chamber was coupled to an amplifier having an electrometer tube, all mounted in the scanning gauge, to amplify the ionization chamber current changes. The signal coupled over the cables was small to start with, but the cables introduced additional complications because of their length and the severe environmental conditions through which the cables passed.

The severe environmental conditions also effected the air-gap condition (temperature, pressure or density of the air between the sheet material and the sensor). The gauge signal could change due to air-gap condition change, adding another problem to installation of a reliable and accurate measuring system.

Another problem, compounding the difficulties in some installations, was the obvious need to continuously connect the gauge, as it scanned, to the cables. To meet this problem, one arrangement included loops of cable arranged to move with the gauge to provide a flexible connection. These loops added to the length of cable, occupied considerable room and introduced possible trouble due to wear or environmental conditions.

The disadvantages and limitations of prior art scanning gauge measuring systems have been substantially overcome for many industrial processes by the present invention.

OBJECTS

For it is an object of the present invention to provide a scanning gauge measuring system that eliminates the need for cables connecting the gauge sensor to the signal processing equipment.

It is another object of the present invention to reduce the space required to install a scanning gauge, by eliminating the need for a flexible cable connection to the gauge sensor.

It is a further object of the present invention to increase the signal magnitude received at the signal processing equipment from a scanning gauge, even when the signal processing equipment is located a considerable distance from the gauge and the sensor includes ionization chamber.

A still further object of the present invention is to provide a signal from a scanning gauge substantially unaffected by the severe industrial environment adjacent the gauge.

It is a further object of the present invention to eliminate the need for an electrometer tube and D.C. power supply for the ionization chamber of a scanning gauge.

It is a further object of the present invention to provide an improved method and apparatus of compensation for air-gap condition changes.

BRIEF DESCRIPTION OF INVENTION

These and other objects are accomplished by the present invention. Described briefly, the present invention is a measuring system with a scanning gauge to be mounted for movement across a traveling sheet material formed or treated in some way by an industrial process. The scanning gauge comprises a sensor having a condition which varies with a property of the sheet material. The gauge includes means for generating a radio-frequency signal and electromagnetically radiating the signal to a location remote from the gauge position. The sensing means condition causes the frequency of the signal to vary, converting the property variation into a proportional change in the radiated signal. At a remote location, means is provided for receiving the electromagnetically radiated signal, measuring the frequency change, and converting the frequency change into a corresponding indication of the property.

Another part of the present invention includes apparatus and method for compensating a nuclear radiation gauge for changes in air-gap condition. The nuclear radiation gauge produces a pulse train having a frequency determined by the radiation received from the material. The material property to be measured effects the radiation intensity. The method includes the steps of comparing the frequency of the gauge pulse train with a reference pulse train of a predetermined frequency to measure the property, and varying the reference pulse train frequency to compensate the measurement for changes due to air-gap condition.

FIGURES BRIEFLY DESCRIBED

One embodiment of the present invention is illustrated by the drawings, wherein, FIGURE 1 is a perspective view, partially in schematic form, of an industrial process and one embodiment of a measuring system in accordance with the present invention;

FIGURE 2 is a schematic circuit diagram of the measuring system shown in FIG. 1;

FIGURE 3 is a graph used to describe the operation of the present invention;

FIGURE 4 is an alternative embodiment of the present invention.

DETAILED DESCRIPTION OF SYSTEM COMPONENTS

While the preferred embodiment of the present invention will be described using a nuclear type radiation sensor for a scanning gauge, it is apparent that other types of sensors can be employed, such as sensors measuring capacitance changes, or using infrared radiation, or magnetic affects, to measure a property of a traveling sheet material. Similarly, the industrial process forming or treating the sheet material may take many forms. Rubber, plastics, steel, coating, and impregnating are merely examples of sheet material processes where the present invention can be employed successfully.

In FIG. 1 is shown a measuring system 1, including a scanning gauge 2, signal processing equipment 3, and a stage 4 of an industrial processing apparatus. The other stages of processing apparatus 4 are omitted for clarity. The entire arrangement would include, usually, several stages which form or treat a sheet material 5 which moves in the direction of arrow 6 from stage 4. Stage 4 can be part of a paper machine, for example, forming a sheet of uniform profile thickness. Gauge 2 is of the nuclear radiation type, arranged to measure the thickness, or density, or weight per unit area (terms used with equal meaning hereinafter) of the paper.

The scanning movement of gauge 2 is permitted by a track 7, formed from a T-shape bar that extends underneath sheet material 5 (as viewed in FIG. 1 (to support a U-shaped frame 8. Sheet material 5 passes between the legs of frame 8, and the length of these arms is sufficient to allow the gauge head 9 to move from one edge to the opposite edge of sheet material 5.

The propulsion arrangement for gauge 2 is of a standard design, represented in part by driving motor 10 which co-acts with an assembly, such as a continuous chain (not shown) to draw gauge frame 8 across sheet material 5. The sequence of gauge scanning is programmed by a traversing control 11 which can provide a periodic back-and-forth scan, in the directions indicated by arrows 12. Further details on the gauge mechanical design and the scan control apparatus can be found in United States Patent 2,829,268, for example.

The property measurement is made by a sensor 13 (FIG. 2) mounted in gauge head 9. Since the preferred embodiment is a nuclear radiation gauge, sensor 13 uses nuclear radiation to measure the sheet material thickness. The nuclear radiation used depends on the sheet material characteristics. For paper, a beta radiation source 14 using Krypton 85 is preferred. Source 14 is mounted in the lower arm of gauge frame 8, opposite an ionization chamber 15 mounted in gauge head 9. The beta radiation from source 14 passes into sheet material 5 and part of the radiation is absorbed. The intensity of the radiation reaching ionization chamber 15 is a function of the sheet material thickness.

Within gauge head 9 is a radio-frequency oscillator 16 of any one of several conventional designs having a frequency determining circuit 17. A Wein bridge oscillator would use a resistance-capacitance frequency determining circuit, but in the example, frequency determining circuit 17 includes an inductor 18 and a capacitor 19 in parallel. The frequency of oscillator 16 is changed by the sheet material thickness, because ionization chamber 15 has its outer and inner electrodes connected across frequency determining circuit 17. The impedance of ionization chamber 15 changes with radiation intensity. The single frequency radio-frequency signal produced by oscillator 16 is coupled to a radio-frequency amplifier 20. Oscillator 16 and amplifier 20 can be powered by an electrical source through power lines (not shown) connected to move with gauge 2.

It can be seen that the apparatus just described provides a sensor that has a condition (impedance) which is changed by the sheet material property being measured and a radio-frequency signal is generated having a frequency which is a function of the condition (impedance) and the sheet material thickness.

Space and environment may preclude a satisfactory installation of a standard scanning gauge using cables to connect an amplified ionization chamber signal to signal process equipment. But the radio-frequency signal from gauge 2 can be radiated electromagnetically to a location remote from processing apparatus stage 4 and gauge 2. On the upper leg of gauge frame 8 is an antenna 21 supported on insulators and coupled to amplifier 20. Antenna 21 is flush mounted to occupy minimum additional space and is tuned for maximum effective radiation by suitable coupling elements in amplifier 20.

The entire assembly of ionization chamber 15, oscillator 16, amplifier 20, and antenna 21 are mounted on gauge frame 8, as represented by the dash line 41, moving therewith as gauge 2 scans.

The electromagnetic radiation from antenna 21, symbolized by the line 22, permeates regions remote from gauge 2. At a suitable location, signal processing equipment 3 is mounted in a console 23 and arranged to pick up the electromagnetic radiation 22, by an antenna 24 (FIG. 1). In console 23 is the indicating and recording devices as well as other controls used by the operators of the paper machine.

The radio-frequency signal picked up by antenna 24 is coupled to a receiver 25 having radio-frequency amplification and selectively to increase the received signal and discriminate against unwanted signals. One or more stages of intermediate frequency conversion can be used, ultimately providing a high signal-to-noise ratio. A bandwidth of frequencies is accepted in receiver 25 to accommodate the range of expected frequency change due to the sheet material thickness change. The amplified signal in receiver 25 is hetrodyned in a mixer (not shown), with a reference signal from beat-frequency-oscillator (BFO) 26 to produce a beat frequency which is in or near the audio range. As shown, BFO 26 had an adjustable frequency for a reason to be described later. It can be a fixed reference frequency and for purpose of the present description will be assumed to be fixed. Thus, a change in the sheet material thickness will cause a change in the beat frequency and the frequency deviation from the reference frequency corresponding to a desired thickness, permits the measurement of the sheet material thickness.

The beat frequency signal is coupled, over line 36 to frequency measuring equipment mounted in console 23. Two types of frequency measuring devices are shown, a frequency or pulse counter 27 and a demodulator 28. Pulse counter 27 counts either the positive or negative portion of each cycle and registers the number on a convenient meter and/or prints out the number for a record. Demodulator 28 rectifies the beat frequency signal and provides a D.C. signal proportional to the beat frequency. The D.C. signal is coupled to a recorder 29 that continuously records the changes in frequency on a chart that is scaled in units of the sheet material thickness. Frequency counter 27 and recorder 29 provide a continuous indication of the sheet material thickness.

In severe environments, compensation for air-gap condition may be important. Several approaches have been proposed in the prior art. The air-gap is the region between source 14 and ionization chamber 15. Air in this region can change density. Either temperature or pressure, or both, adjacent the side of sheet material 5 can be measured. Several prior art systems have produced signals proportional to the air-gap condition and electrically bucked the ionization chamber signal to compensate for changes in the gauge signal due only to air-gap condition.

Measuring system 1 has provision for air-gap condition compensation. When air-gap condition compensation is provided, BFO 26 is not at a fixed reference frequency. Its frequency is adjustable, such as by turning the shaft of a capacitor in the frequency determining circuit of BFO 26 (as represented by the arrow through the BFO unit). An air-gap condition sensor 30 is mounted adjacent the lower side of sheet material 5 (as viewed in FIG. 2). A suitable sensor is a thermistor for air-gap temperature measurement. The thermistor is connected into a Wheatstone bridge 31 having an adjustable resistance leg (not shown) driven by a servo 32 (the driving relation being represented by dashline 33). Servo 32 also drives the adjustable frequency determining element of BFO 26 (the driving relation being represented by dashline 34). The BFO reference frequency changes in response to a change in air-gap condition and the beat frequency changes, altering the frequency measurement for a particular sheet material thickness.

The air-gap compensation circuit is set up and calibrated to change the BFO reference frequency in a direction and to an extent that the beat frequency is restored to the beat frequency for a specific sheet material thickness at a nominal or reference air-gap condition. As the air-gap condition changes (temperature when using a thermistor), the radiated signal from gauge 2 changes, because the air-gap is part of the measured sheet material thickness. This change in the gauge signal frequency is compensated for by changing the reference frequency to restore the beat frequency present before the air-gap condition changed. Adjustments can be provided to set a desired nominal temperature and to adjust the span or percent change in the BFO reference frequency for a given change in air-gap condition.

OPERATION OF THE MEASURING SYSTEM

The change in frequency of the radiated signal from gauge 2 can be conveniently plotted versus the thickness of sheet material 5, as shown in FIG. 3. The frequency change ($\Delta f$) from a frequency produced when the sheet material is removed from gauge 2 increases with increasing sheet material thickness as shown by curve 40. The graph of FIG. 3 was drawn from data obtained using a one curie source of Krypton 85. At a frequency of about three megacycles for oscillator 16, the frequency change ranged from 269 cycles when one sheet of paper, 3.5 mg./cm.$^2$, was placed between the source and ionization chamber, to a 1010 cycle change when six of these sheets were inserted.

The disclosed measuring system using a scanning gauge has the advantages of a fast response time for measuring rapid changes in thickness profile. The conventional electrometer amplifier and flexible cable connection for carrying the gauge signal to the signal processing equipment are dispensed with. In lieu thereof, a compact apparatus is used which reduces the space required for installation and provides a high signal-to-noise ratio at the signal processing equipment, irrespective of its location and the environment therebetween.

ALTERNATIVE EMBODIMENTS

The disclosed embodiment of the present invention is merely illustrative of several forms of apparatus. Measuring system 1 can be operated without air-gap condition compensation, holding the reference frequency of BFO 26 constant by disabling the servo 32. The method of air-gap condition compensation can be practiced by manual adjustment of the frequency of BFO 26, for slow air-gap condition changes. The automatic system shown will compensate for rapid changes in air-gap condition.

The mechanical construction of the gauge can be selected based on the industrial process. The electrical design can change with preference as to vacuum tubes or transistors, the type of sensor used, and the technique used to cause the sensor condition to vary the oscillator frequency. Frequency counters, demodulators, and recorders are standard hardware, and receiver 25, if desired, can be a communications receiver or any modified form of more simplified circuit design to accomplish the frequency comparison.

The scanning gauge can be used to read out the sheet material profile thickness, as performed by recorder 29. Alternatively, the signal from the scanning gauge can be averaged for one complete scan across the sheet material and the average thickness readout and/or used to control the industrial process to return the thickness to a desired thickness.

The air-gap condition compensation method can be applied to all nuclear sensors producing a pulse train with a rate proportional to radiation intensity, whereby the beat frequency remains the same irrespective of air-gap condition changes.

The embodiment of FIGURE 4 is another arrangement for compensating for air-gap condition with gauge 2. The source 14 and ionization chamber 15 are arranged as a nuclear gauge with an air-gap on either side of sheet material 5. The air-gap condition is sensed by a temperature-sensitive capacitor 51 located in the air-gap (location represented by dotted line 52). Capacitor 51 is connected in frequency determining circuit 17 of oscillator 16, across capacitor 19. Oscillator 16 then performs as in the apparatus shown in FIGURE 2, except that the oscillator frequency is changed with air-gap temperature and the reference frequency from BFO 26 is fixed. Capacitor 51 can be adjusted to change its temperature coefficient. One suitable type of capacitor is manufactured by Oxley Development Company, Ltd. of England, termed a "Thermotrimmer." For example, the air-gap temperature may go up from a nominal temperature; the air-gap density would decrease, increasing the frequency of oscillator 16. Without compensation, it would appear that the thickness of sheet material 5 decreased. Capacitor 51 would have a positive temperature coefficient and, being in the air-gap, senses the change in temperature, increasing its capacitance and restoring the oscillator frequency to the original frequency corresponding to the sheet material thickness.

Frequency determining circuit 17 can be arranged in several ways to accommodate a means responsive to air-gap condition to change the oscillator frequency. These arrangements depend on the type of air-gap condition sensor, oscillator design, and the nominal temperature used. The frequency determining circuit 17 can be arranged to provide the desired span of frequency adjustment for a given air-gap condition change, by selecting or adjusting the temperature coefficient of the air-gap condition sensor.

These and other changes and modifications are to be part of the present invention, the scope being limited only by the appended claims.

I claim:

1. In combination with apparatus for processing a traveling sheet material, a gauge positioned to measure a property of said material and mounted for movement across said sheet material, means for moving said gauge across said sheet, said gauge having an ionization chamber comprising an inner and outer electrode, a source of nuclear radiation on said gauge irradiating said sheet material and causing a portion of said radiation from said sheet material to reach said ionization chamber, the radiation intensity reaching said ionization chmber being a function of a property of said sheet material, an oscillator on said gauge for generating a radio-frequency signal, said oscillator having a frequency determining circuit, said inner and outer ionization chamber electrodes being connected to said oscillator to form part of said frequency determining circuit, said oscillator having a frequency corresponding to a desired value of said property and changing frequency as a function of a change in said radiation intensity, means on said gauge coupled to said oscillator to electromagnetically radiate said radio-frequency signal to a remote location from said gauge position and said processing apparatus, means disposed at said remote location for receiving said electromagnetically radiated radio-frequency signal, said receiving means comprising a reference frequency source and means for comparing said reference frequency and said received radio frequency to produce a signal that is a function of the difference, means coupled to receive said difference signal to indicate the measured property.

2. In combination with apparatus for processing a traveling sheet material, a gauge positioned to measure a property of said material and mounted for movement across said sheet material, means for moving said gauge across said sheet, said gauge having an ionization chamber having spaced electrodes, a source of nuclear radiation on said gauge for irradiating said material and causing a portion of said radiation from said material to reach said ionization chamber as a function of a property of said material, an oscillator on said gauge for generating a radio-frequency signal, said oscillator having a frequency determining circuit, said spaced electrodes of said ionization chamber being connected to said frequency determining circuit to cause said oscillator to change frequency as a function of changes in said radiation reaching said ionization chamber, means on said gauge and coupled to said oscillator for electromagnetically radiating said signal to a location remote from said gauge position, means located at said remote location for receiving said electromagnetically radiated signal, said receiving means comprising a source of a reference frequency, and means for comparing said reference frequency and said received radio frequency signal to produce an output signal that is a function of the difference in frequency and indicative of the value of said material property.

3. In combination with apparatus for processing a traveling sheet material, a support adjacent said sheet material, a gauge frame mounted on said support for movement across said sheet, means for moving said gauge frame back-and-forth to scan across said sheet, said gauge frame having a head, an ionization chamber disposed within said gauge head, said gauge frame having a nuclear radiation source mounted opposite said gauge head on the other side of said sheet and projecting nuclear radiation source through said sheet material to said ionization chamber, the radiation intensity reaching said ionization chamber being a function of the weight-per-unit area of said sheet material, said ionization chamber having space electrodes, said gauge head having an oscillator for generating a radio-frequency signal, said oscillator having a frequency determining LC circuit, said ionization chamber electrodes being connected across said LC circuit to alter the oscillator frequency, due to the radiation intensity reaching said ionization chamber changing ionization chamber impedance, a first antenna mounted on said gauge frame and coupled to said oscillator to electromagnetically radiate effectively said oscillator signal to a location remote from said sheet material, a console positioned at said remote location, a second antenna adjacent said console for receiving said electromagnetic radiation from said first antenna, a radio-frequency receiver coupled to said antenna and tuned to receive said radiated frequency, said receiver having intermediate-frequency conversion and a beat-frequency oscillator to produce an audio signal having a frequency which varies with said sheet material property, means coupled to receive said audio signal to measure said frequency and produce a D.C. signal that is a function of said frequency, a recorder coupled to said D.C. signal to register the profile of said sheet material as said gauge head scans said sheet material.

4. Apparatus, as described in claim 3, wherein, said beat-frequency oscillator includes means for adjusting the beat-frequency oscillator frequency comprising means, including a temperature sensor positioned to be responsive to the air-gap temperature between said source and ionization chamber, to operate said beat-frequency oscillator adjusting means, changing the beat-frequency oscillator frequency to compensate for a change in said received frequency due to air-gap temperature change, so that said D.C. signal coupled to said recorder is substantially insensitive to changes in air-gap temperature.

5. In combination with apparatus for processing a traveling sheet material, a nuclear radiation gauge positioned to measure a property of said material and mounted for movement across said sheet material, means for moving said gauge across said sheet, said gauge having a sensing means with a condition that varies with said material property, means on said gauge for generating a radio-frequency signal and electromagnetically radiating said signal to a location remote from said gauge position and processing apparatus, said sensing means causing the frequency of said signal to vary, converting said property variation into a proportional change in said signal frequency, means located at said remote location for receiving said electromagnetically radiated signal, said receiving means including a reference source of a selected frequency and means for comparing the frequency of said received signal with said reference signal frequency and indicating said sheet material property as a function of the frequency difference, and means responsive to the air-gap condition for said gauge to vary said reference source frequency in such a direction as to compensate for changes in said received signal due to air-gap condition changes.

6. Apparatus for compensating a nuclear radiation gauge for changes in the air-gap condition of the radiation path from a source to a detector through which path a material passes to be measured, comprising a nuclear radiation gauge for producing a first pulse train having a frequency determined by the radiation received from said material having a property to be measured, said property effecting said radiation intensity, means for producing a reference pulse train of a predetermined frequency, means for comparing the frequency of said first pulse train with the frequency of said reference pulse train to indicate said property, means responsive to said air-gap condition of said radiation path for automatically varying said reference pulse train frequency to compensate for changes in said first pulse train frequency due to an air-gap condition change.

7. A method of compensating a nuclear radiation gauge for changes in the air-gap condition of the radiation path from a source to a detector through which path a material passes to be measured, said nuclear radiation gauge producing a first pulse train having a frequency determined by the radiation received from a material having a property to be measured, said property effecting said radiation intensity, comprising the steps of:

comparing the frequency of said first pulse train with a reference pulse train of a predetermined frequency to measure said property, sensing said air-gap condition of said radiation path, and varying said reference pulse train frequency in response to changes in said sensed air-gap condition to compensate said measurement for changes due to said air-gap condition.

8. Apparatus for compensating a nuclear radiation gauge for changes in air-gap condition, comprising a nuclear radiation gauge for measuring a property of a material, an oscillator on said gauge having a predetermined frequency, said oscillator including radiation sensing means connected to change the frequency of the oscillator signal as a function of received nuclear radiation intensity, means in said oscillator responsive to the nuclear gauge air-gap condition, to compensate for changes in said oscillator frequency due to changes in said air-gap condition, and means responsive to said oscillator frequency for indicating said property.

9. A method of compensating a nuclear radiation measurement of a material property for changes in the air-gap condition of the radiation path from a source to a detector through which path a material passes to be measured, said nuclear radiation measurement producing a signal having a frequency that varies with a property of said material, comprising the steps of:

varying the frequency of the measured signal in response to changes in said air-gap condition, and measuring the frequency of said varied signal to indicate the property of said material.

10. Apparatus for compensating a nuclear radiation gauge for changes in air-gap condition, comprising a nuclear radiation gauge for measuring a property of a material, an oscillator on said gauge, a frequency determining circuit in said oscillator, an ionization chamber having first and second electrodes, said ionization chamber first and second electrodes being connected in said frequency determining circuit, said oscillator frequency thereby being a function of the radiation intensity received by said ionization chamber, a temperature-sensitive element located to respond to the temperature in said air-gap, said element being connected in said frequency determining circuit, to adjust said oscillator frequency to compensate for changes in said oscillator frequency due to changes in air-gap condition, and means responsive to said oscillator frequency for indicating said property.

11. Apparatus for compensating a nuclear radiation gauge for changes in air-gap condition, comprising a nuclear radiation gauge for measuring the property of a sheet material, an oscillator on said gauge, a frequency determining circuit in said oscillator including a capacitance element, an ionization chamber having first and second electrodes, said ionization chamber first and second electrodes being connected across said capacitance element, the frequency of said oscillator signal thereby being a function of the radiation intensity received by said ionization chamber, a temperature-sensitive capacitor connected in said frequency determining circuit and position in said air gap, to restore said oscillator to a frequency corresponding to the material property when a change in air-gap temperature occurs, and means for receiving said oscillator signal and indicating said property as a function of the signal frequency.

References Cited

UNITED STATES PATENTS

| | | | |
|---|---|---|---|
| 2,507,351 | 5/1950 | Scherbatskoy | 250—83.6 |
| 2,919,351 | 12/1959 | Swift | 250—83.6 |
| 2,957,081 | 10/1960 | Chapman | 250—83.3 |
| 3,167,652 | 1/1965 | Weisbrich | 250—106 |
| 3,248,545 | 4/1966 | Hansen | 250—83.3 |

ARCHIE R. BORCHELT, Primary Examiner

U.S. Cl. X.R.

250—83.3